US012800063B2

(12) United States Patent
Hite

(10) Patent No.: US 12,800,063 B2
(45) Date of Patent: Nov. 17, 2026

(54) FLUID CONTROL VALVE WITH PERFORMANCE MONITOR

(71) Applicant: Bradford T Hite, Valencia, CA (US)

(72) Inventor: Bradford T Hite, Valencia, CA (US)

( * ) Notice: Subject to any disclaimer, the term of this patent is extended or adjusted under 35 U.S.C. 154(b) by 154 days.

(21) Appl. No.: 18/427,643

(22) Filed: Jan. 30, 2024

(65) Prior Publication Data

US 2025/0243948 A1 Jul. 31, 2025

(51) Int. Cl.

| | |
|---|---|
| ***F16K 37/00*** | (2006.01) |
| ***A01G 25/16*** | (2006.01) |
| ***F16K 31/06*** | (2006.01) |
| ***G01F 1/36*** | (2006.01) |
| ***G01F 1/38*** | (2006.01) |
| ***G01F 1/42*** | (2006.01) |

(52) U.S. Cl.

CPC .......... *F16K 37/0091* (2013.01); *A01G 25/16* (2013.01); *F16K 31/0675* (2013.01); *F16K 37/005* (2013.01); *F16K 37/0075* (2013.01); *G01F 1/36* (2013.01); *G01F 1/363* (2013.01); *G01F 1/383* (2013.01); *G01F 1/42* (2013.01)

(58) Field of Classification Search

CPC .... F16K 37/005; F16K 31/0675; F16K 27/12; F16K 37/0091; F16K 37/0075; G01F 1/36; G01F 1/363; G01F 1/42; G01F 1/383

See application file for complete search history.

(56) References Cited

U.S. PATENT DOCUMENTS

| | | | | |
|---|---|---|---|---|
| 5,748,466 A * | 5/1998 | McGivern | .......... | G05B 19/0423 239/66 |
| 2012/0267126 A1* | 10/2012 | Volk | ......................... | A62C 3/07 169/46 |
| 2013/0154841 A1* | 6/2013 | Kucera | ................... | F23N 1/005 73/40 |
| 2013/0181630 A1* | 7/2013 | Taipale | .................. | H05B 47/11 315/210 |
| 2018/0275623 A1* | 9/2018 | Pellini | .................... | G08C 19/02 |
| 2023/0367338 A1* | 11/2023 | Tamura | ................ | G05D 7/0635 |

FOREIGN PATENT DOCUMENTS

| | | | | |
|---|---|---|---|---|
| BR | 9703260 A * | 9/1998 | ............... | G05D 3/12 |
| CN | 115654160 A * | 1/2023 | ............... | B08B 5/02 |
| CN | 118856072 A * | 10/2024 | ........... | F16K 31/007 |

* cited by examiner

*Primary Examiner* — Atif H Chaudry

(57) ABSTRACT

A unique system for the implementation of an automated fluid control system is described whereby individual valves support commanded operation and operational performance status reporting via a digital data interface. A further feature of the invention is the addition of a differential pressure orifice based flow sensor to each valve allowing low cost sensing of conditions for underflow, overflow and leakage without moving parts. Operational parameters are collected by the valve electronics and transmitted back to a controller module for performance monitoring. Valve parameters such as inlet/outlet pressures, solenoid current and flow rate can be used by the controller module to perform system fault analysis and aid in problem diagnosis. Overall base flow rate sizing of the valve is achieved by an optional field replaceable fixed orifice allowing customization of valve operation.

5 Claims, 6 Drawing Sheets

Typical Irrigation System Block Diagram

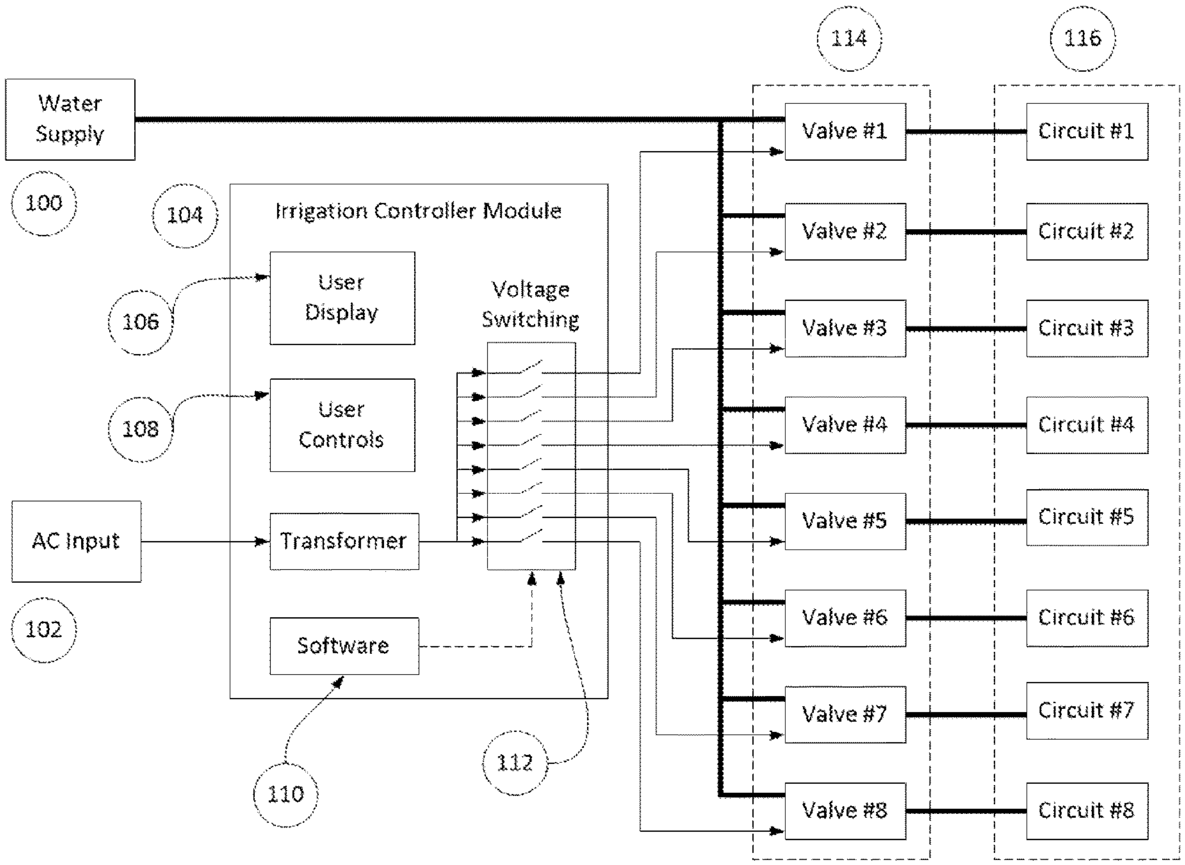
FIG. 1 – Typical Irrigation System Block Diagram

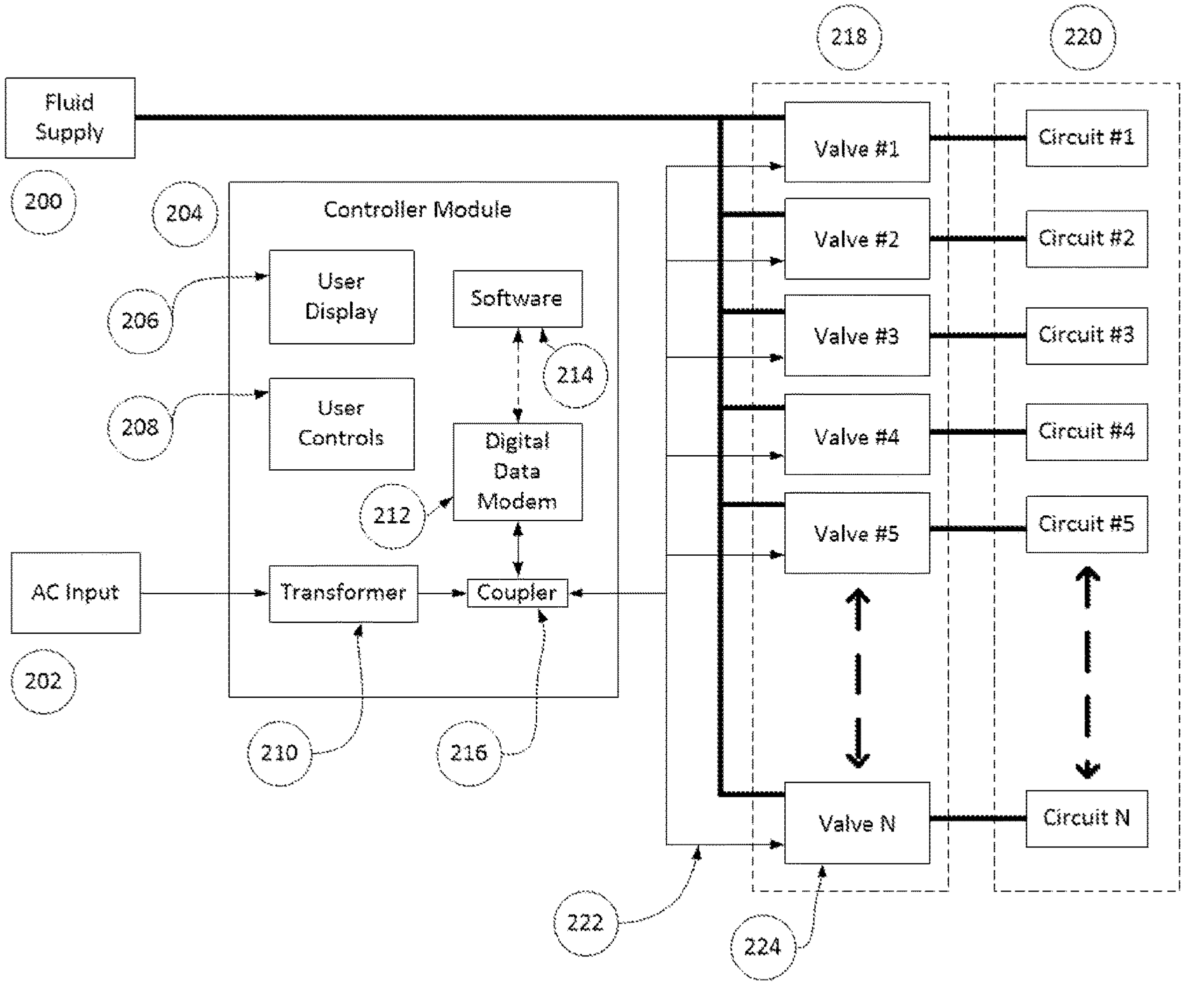
FIG. 2 – System Block Diagram

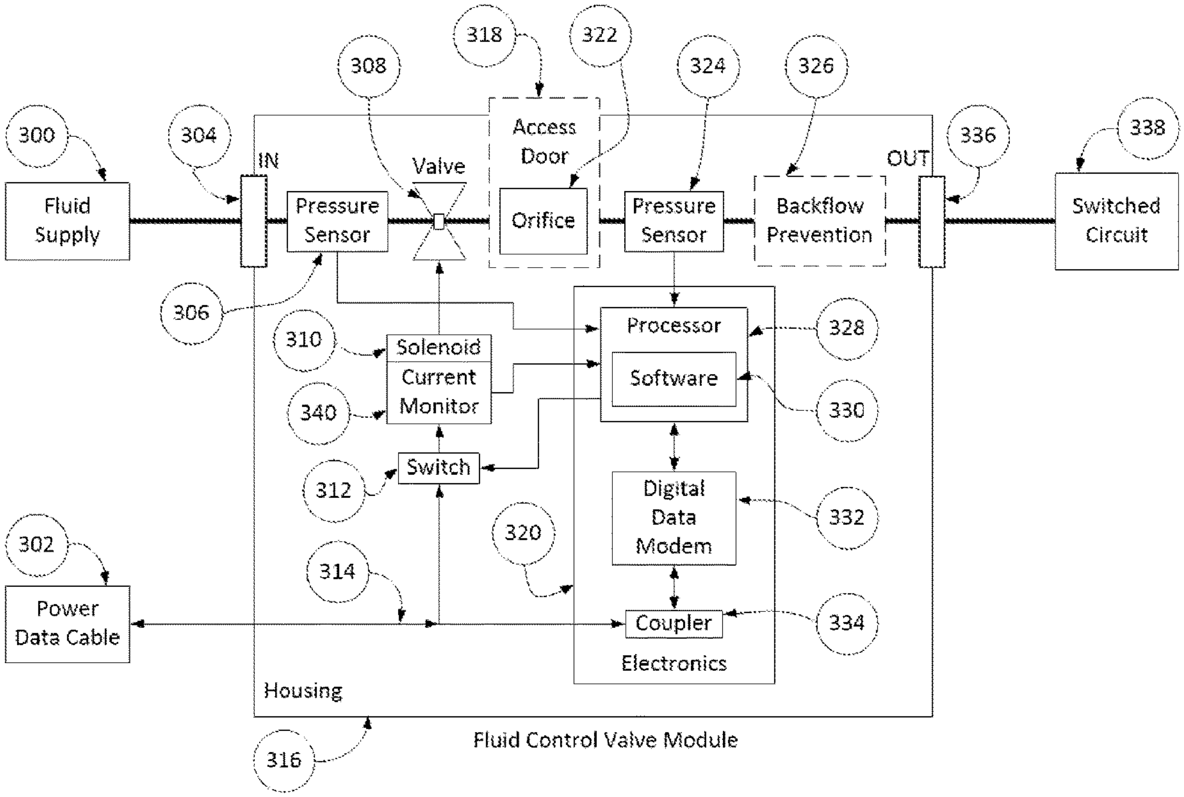
FIG. 3 – Valve Block Diagram

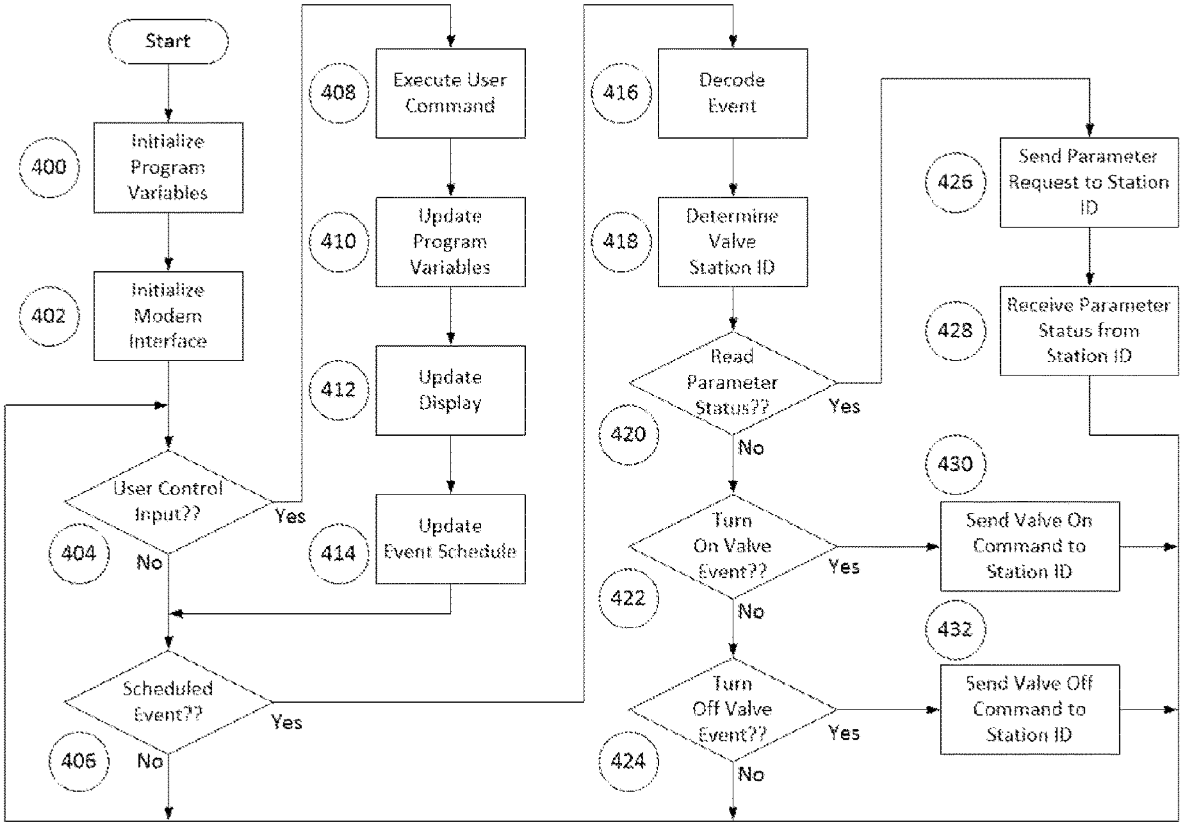
FIG. 4 – Controller Module Example Software Flow Chart

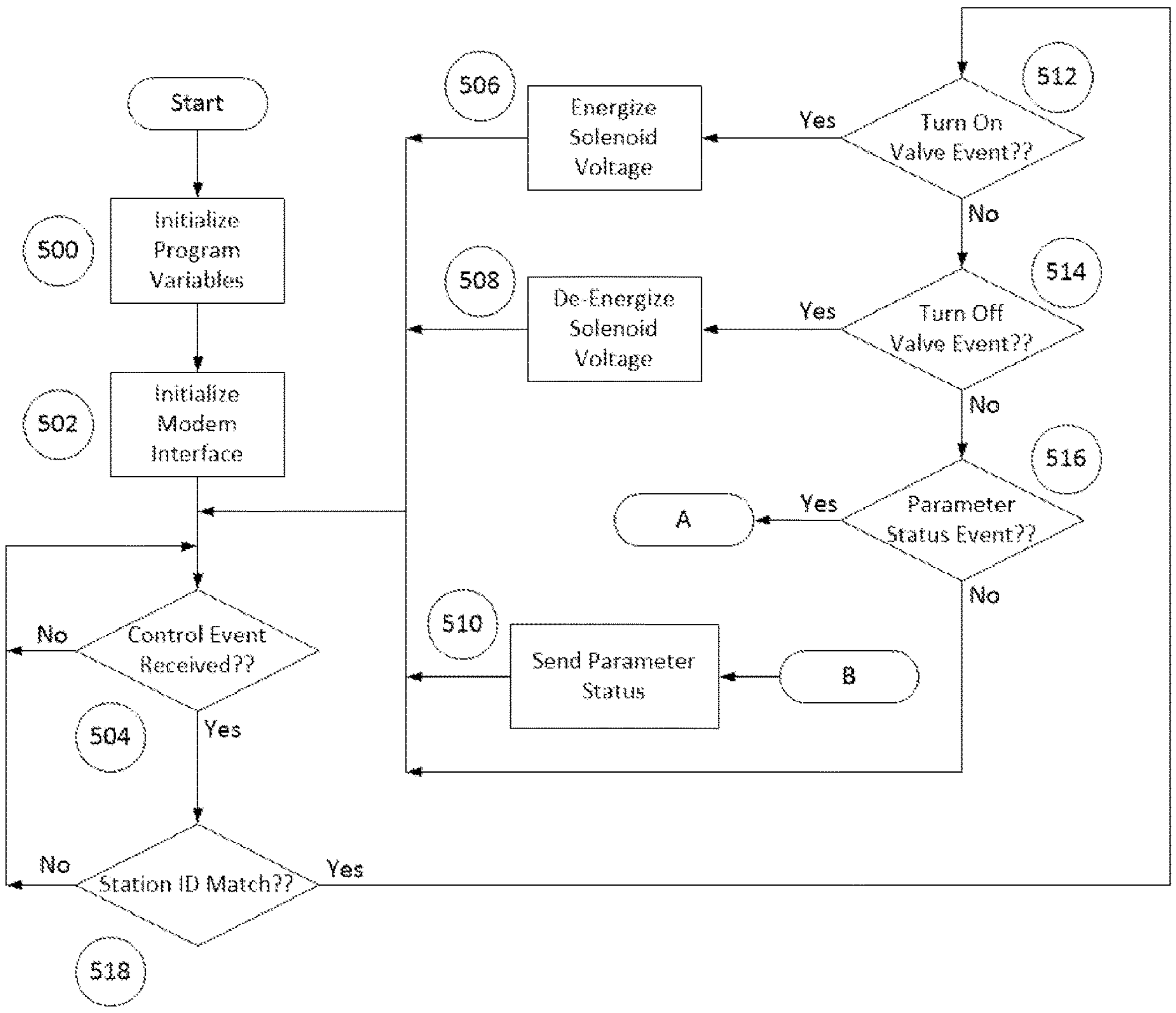
FIG. 5 – Valve Station Control Example Software Flow Chart

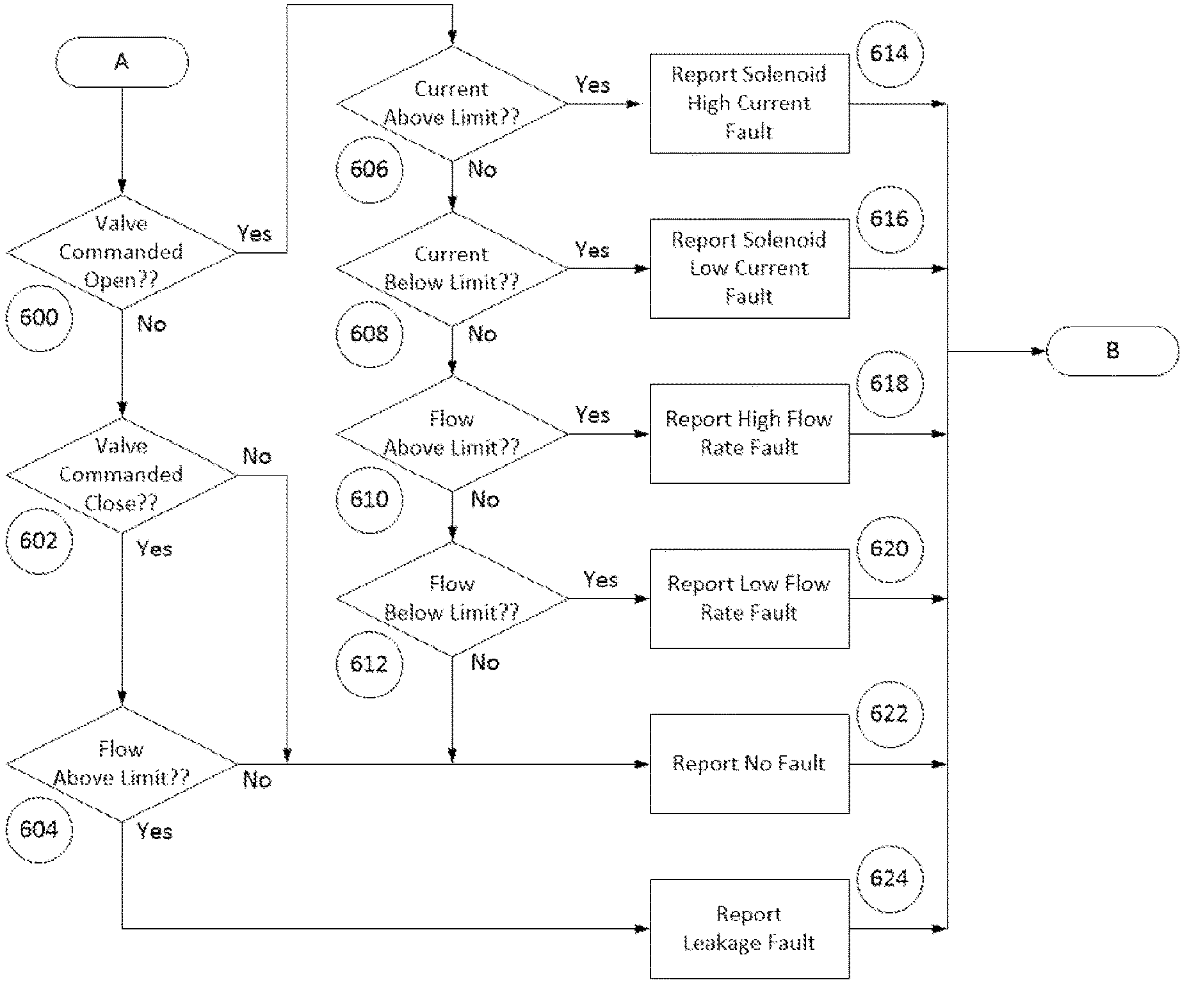
FIG. 6 – Valve Station Performance Monitor Example Software Flow Chart

FLUID CONTROL VALVE WITH PERFORMANCE MONITOR

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCES CITED

U.S. Patent Documents

| | | | |
|---|---|---|---|
| 11,237,574 | B2 | February 2022 | Halimi |
| 5,971,011 | A | October 1999 | Price |
| 8,155,896 | B2 | April 2012 | Wargo |

Foreign Patent Documents

Not Applicable

Other Publications

Not Applicable

BACKGROUND OF THE INVENTION

1. Field of the Invention

This invention relates to the field of automatic fluid control valves commonly found in such applications as garden, agriculture or landscape water irrigation control systems. Connection of multiple valve stations to a common controller module can be achieved by utilization of a common two-wire connection approach supplying both digital control data and power signals. Integration of low-cost flow rate, pressure and solenoid current monitoring sensors within each valve station allows performance monitoring for detection of damaged or malfunctioning valve components. Further reliability enhancements are provided by a design concept eliminating most moving parts within the valve assembly being prone to failure. Common failure modes for a valve including on-state underflow/overflow, solenoid over/under current and off-state leakage conditions can be sensed and reported back to the controller module. The present invention leverages off digital communications between valve/controller and parameter sensing within each valve enabling a simpler and more robust system concept.

2. Description of the Related Art

The largest example of a fluid control system is the applications and marketplace found within irrigation systems being a mature field for over 40 years. Overall, the usage applications can be split into home automated sprinkler systems or much larger commercial agriculture systems. Both system types are commonly organized around a central controller node and multiple remote valve stations to automatically oversee the distribution of water. Multiple commercial vendors service the irrigation market offering separate products such as computer based controller nodes, flow/pressure/moisture sensors and valve components. Recently, these products have been upgraded to include newer solar or wireless technology for performing the same overall water distribution function.

A typical irrigation system is shown in reference system block diagram FIG. 1 for a multiple valve configuration. Water supply input 100 provides the source of water to be controlled by the system. AC power input 102 provides electrical power necessary to actuate each valve and power controller module 104. User display 106 and User controls 108 allow an operator to configure and interact with the system by interfacing with control software 110. Voltage switching bank 112 individually selects a valve for actuation based on commands from control software 110. AC input voltage 102 is reduced by a transformer prior to input to voltage switching bank 112. Individual valves in valve group 114 are connected to common water supply 100 at the inlet port and an irrigation circuit at the outlet port. Each valve has a separate point-to-point two wire power interface to the controller module associated with individual switches in voltage switching bank 112. Irrigation circuits within group 116 are individually activated based on valve turn on or off.

Problems can arise in standalone automated irrigation systems which are both hard to access and troubleshoot. The most common issues with solenoid-based valves are not opening/closing properly and overheating. These issues can sometimes be solved by cleaning out residual debris, but are sometimes the result of an electrical or water pressure issue. Troubleshooting of these issues typically involves steps for 1) isolating the bad valve; 2) disassemble of the faulted valve and 3) usage of electronic test equipment to determine the failure. The present invention provides means for local valve performance monitoring to detect common problems and reporting of the status to a central controller module.

Several prior art references in this field teach the usage of various sensor types to monitor and control valve flow rate characteristics. Most recently, Halimi in U.S. Pat. No. 11,237,574 titled “Fluid Monitoring and Control System” describes a control valve with integrated Hall Effect flow sensor for fluid monitoring and control. Halimi’s system includes a data interface between multiple valve stations and a central hub module. The primary purpose of Halimi’s system is to provide valve closure based upon monitoring of multiple operating parameters. This different from the present invention whereby the valve sensors provide a performance monitoring function used to detect a valve failure. In another prior art reference, Wargo in U.S. Pat. No. 8,155,896 titled “Fluid Flow Measuring and Proportional Fluid Flow Control Device” describes a system for proportional valve control based on an orifice differential pressure flow rate sensor. The system of Wargo teaches receiving a setpoint from an external controller to adjust the valve operation. This is different from the present invention which specifically outputs monitored sensor status to a central controller module. Another shutoff valve implementation is described by Price in U.S. Pat. No. 5,971,001 titled “Water Shut-off Valve and Leak Detection System”. In the system of Prince, a Hall Effect flow rate sensor is used to monitor the operation of a solenoid valve and provide closure if an error has been detected. The system teaches a configuration consisting of only a local valve station having no central controller module. Again, this is different then the present invention which requires bi-directional communications with a central controller module. Other unique features of the present invention require valve internal implementation of monitoring of the solenoid current and usage of an orifice differential pressure circuit to measure fluid flow rate. The orifice can be made field replaceable by the addition of an optional access door to the valve housing.

BRIEF SUMMARY OF THE INVENTION

The present invention comprises an automated fluid control system whereby individual valves support commanded operation and operational performance status reporting via a digital data interface. A further feature of the present invention is the addition of a differential pressure orifice based flow rate sensor to each valve allowing low cost sensing of conditions for underflow, overflow and leakage without moving parts. Operational parameters are collected by the valve electronics and transmitted back to a controller module for performance monitoring. Valve parameters such as inlet/outlet pressures, solenoid current and flow rate can be used by the controller module to perform system fault analysis and aid in problem diagnosis. Modification of the base flow rate sizing for the valve can be achieved by an optional field replaceable orifice feature allowing customization of valve operation. Other features and advantages of the present invention will become apparent from the following more detailed description, when taken in conjunction with the accompanying drawings, which illustrate, by way of example, the principles of the invention.

BRIEF DESCRIPTION OF THE DRAWINGS

FIG. 1 is a reference system block diagram showing a typical irrigation integrated system.

FIG. 2 is a system block diagram for the preferred embodiment of the present invention.

FIG. 3 is a block diagram detailing the valve component for the preferred embodiment of the present invention.

FIG. 4 is an example software flow chart detailing the controller module software function process steps.

FIG. 5 is an example software flow chart detailing the valve station control software function process steps.

FIG. 6 is an example software flow chart detailing the valve station performance monitor processing process steps.

REFERENCE NUMERALS IN THE DRAWINGS

| | | | |
|---|---|---|---|
| 100 | Water Supply Input | 102 | AC Power Input |
| 104 | Irrigation Control Module | 106 | User Display for Control Module |
| 108 | User Controls for Control Module | 110 | Control Software |
| 112 | Voltage Switch Bank | 114 | Remote Valve Group |
| 116 | Water Irrigation Output Circuit Group | | |
| 200 | Fluid Supply Input | 202 | AC Power Input |
| 204 | Control Module | 206 | User Display for Control Module |
| 208 | User Controls for Control Module | 210 | AC Power Transformer |
| 212 | Digital Data Modem | 214 | Control Software |
| 216 | Digital Data Coupler | 218 | Remote Valve Group |
| 220 | Output Circuit Group | 222 | Power Data Cable Bus |
| 224 | Individual Valve Component | | |
| 300 | FluidSupply | 302 | Power Data Cable Port |
| 304 | Housing Fluid Inlet Port | 306 | Inlet Pressure Sensor |

-continued

REFERENCE NUMERALS IN THE DRAWINGS

| | | | |
|---|---|---|---|
| 308 | Fluid Control Valve | 310 | Valve Solenoid Actuator |
| 312 | Voltage Switch | 314 | Internal Power Data Connection |
| 316 | Fluid Control Valve Module Housing | 318 | Orifice External Access Door |
| 320 | Valve Module Electronics | 322 | Flow Orifice |
| 324 | Outlet Pressure Sensor | 326 | Backflow Prevention Valve |
| 328 | Processor Executing Control Software | 330 | Control Software |
| 332 | Digital Data Modem | 334 | Digital Data Coupler |
| 336 | Housing Fluid Outlet Port | 338 | Output Switched Circuit |
| 340 | Solenoid Current Monitor | | |
| 400 | Initialize Program Variables Process Step | 402 | Initialize Modem Interface Process Step |
| 404 | User Control Input Decision Block | 406 | Scheduled Event Decision Block |
| 408 | Execute User Command Process Step | 410 | Update Program Variables Process Step |
| 412 | Update Display Process Step | 414 | Update Event Schedule Process Step |
| 416 | Decode Event Process Step | 418 | Determine Valve Station ID Process Step |
| 420 | Read Parameter Status Event Decision Block | 422 | Turn On Valve Event Decision Block |
| 424 | Turn Off Valve Event Decision Block | 426 | Send Parameter Request to Station ID Process Step |
| 428 | Receive Parameter Status from Station ID Process Step | 430 | Send Valve On Command to Station ID Process Step |
| 432 | Send Valve Off Command to Station ID Process Step | | |
| 500 | Initialize Program Variables Process Step | 502 | Initialize Modem Interface Process Step |
| 504 | Control Message Received Decision Block | 506 | Energize Solenoid Voltage Process Step |
| 508 | De-Energize Solenoid Process Step | 510 | Send Parameter Status |
| 512 | Turn ON Valve Decision Block | 514 | Turn OFF Valve Decision Block |
| 516 | Report Parameter Status Decision Block | 518 | Station Match Decision Block |
| 600 | Valve Commanded Open Decision Block | 602 | Valve Commanded Closed Decision Block |
| 604 | Off Flow Above Limit Decision Block | 606 | Current Above Limit Decision Block |
| 608 | Current Below Limit Decision Block | 610 | On Flow Above Limit Decision Block |
| 612 | On Flow Below Limit Decision Block | 614 | Report Solenoid High Current Fault Process Step |

-continued

| REFERENCE NUMERALS IN THE DRAWINGS | | | |
|---|---|---|---|
| 616 | Report Solenoid Low Current Fault Process Step | 618 | Report High Flow Rate Fault Process Step |
| 620 | Report Low Flow Rate Fault Process Step | 622 | Report No Fault Process Step |
| 624 | Report Leakage Fault Process Step | | |

DETAILED DESCRIPTION OF THE INVENTION

The preferred embodiment system block diagram of the present invention is shown in FIG. 2 as an integrated irrigation system. In the context of this preferred embodiment the terms water and fluid are used interchangeably. Fluid supply input 200 provides the common source of fluid to be controlled by the system. AC power input 202 provides electrical power necessary to actuate each valve and power controller module 204. User display 206 and User controls 208 allow an operator to configure and interact with the system by interfacing with control software 214. Examples of user display 206 include but are not limited to an active or passive LCD. User controls 208 for example could be a keypad or selector knob. AC input voltage 202 is reduced by transformer 210 prior to input to data coupler 216. Data coupler 216 serves to isolate the digital data information from the AC input power. In this preferred embodiment, an example two-wire interface is given supporting both digital data and power. Typically, the digital data and power signals are separable by frequency selection whereby the power signal operates at 60 Hz while the digital data can have a higher carrier frequency in the low kilohertz range. Separation of the received digital data from the power signal can be achieved for example by a high pass filter circuit. Conversely, addition of digital data to the power signal for transmission can be performed for example by transformer coupling of the two signals. Digital data modem 212 operates on digital information received from and transmitted to data coupler 216. Examples of digital information supported by digital data modem 212 could be but not limited to industry standard HART or PLC protocols. Control software 214 uses digital data modem to send command and receive status information from each remote valve station in valve group 218. Individual valves in valve group 218 are connected to common fluid supply 200 at the inlet port and an irrigation circuit at the outlet port. A daisy chain connection transferring both power and digital data to/from valve group 218 is implemented by two-wire conductor path 222. The internal configuration of valve 224 is further detailed in FIG. 3. Irrigation circuits within group 220 are individually activated based on associated valve turn on or off.

The internal details for preferred embodiment valve station 224 containing integrated electronics and sensors utilized in system block diagram FIG. 2 is shown in block diagram FIG. 3. The valve housing 316 is typically connected in series using pipe between a common fluid supply and switched circuit. The fluid supply 300 is connected to valve housing inlet port 304 while switched circuit 338 is connected to the valve housing outlet port 336. Input pressure sensor 306 is coupled to the inlet port 304 reporting the measured pressure value to control software 330. A low cost example for pressure sensor 306 would be a MEMS device commonly used to measure fluid pressure. Fluid control valve 308 is coupled to inlet pressure sensor 306 and solenoid 306, the valve is activated by solenoid 310. Several types of solenoid based flow control valves would be apparent to a skilled artisan whereby one example could be a diaphragm valve. Orifice 322 is coupled to flow control valve 308 creating a differential pressure drop allowing flow rate measurement. Fluid control valve 308 and various connecting flow paths to each pressure sensor are sized large enough relative to orifice 322 such that a minimal change to the differential pressure is caused by these components. Orifice 322 can be made replaceable via optional access door 318, shown as a dashed line, to allow customization of the overall valve station base flow rate. Output pressure sensor 324 is coupled to orifice 322 reporting the measured pressure value to control software 330. Again, a low cost example for pressure sensor 306 would be a MEMS device commonly used to measure fluid pressure. An optional additional valve for backflow prevention 326, shown as a dashed line, is included but not necessary for operation of the present invention. One additional input to the valve station is power/data cable 302 serving to transfer both operating power and digital data. Power and digital data information signals are routed internally from external cable 302 to data coupler 334 and voltage switch 312 by internal wiring connection 314. Data coupler 334 isolates digital data information from the AC power signal and couples the signal to digital data modem 332. Digital data modem 332 operates on the digital data information for interface with control software 330 executing on processor 328. Examples for operation of data coupler 334 and digital data modem 332 have been provided above with discussion in reference to FIG. 2. Data coupler 334, digital data modem 332, processor 328 and other various support circuits reside on electronics module 320. Based on digital data information operated on by digital data modem 332, control software 330 will command voltage switch 312 to either an on or off state. When voltage switch 312 is turned on, voltage is applied to solenoid 310 thereby activating a solenoid plunger to open fluid control valve 308. Conversely, fluid control valve 308 is closed upon voltage switch 312 being commanded off by deactivation of the solenoid plunger. When voltage is applied to solenoid 310, current monitor circuit 340 measures the operating current and reports the value to control software 330. Control software 330 monitors sensed values for pressure/current as inputs to a performance monitor function to determine conditions of faulted or abnormal operation. Status information of the performance monitor function can be sent to a controller module 204 via the digital data information interface described above. Another possible connection topology for digital data information communication could allow for direct command/status information transfer between different valve stations.

FIG. 4 shows an example software flowchart describing the operation of control software 214 as a set of process steps. Beginning at the flowchart "Start", after power-up the program variables and modem hardware interfaces are initialized in steps 400 and 402 respectively. After initialization, the software enters a continuous wait loop monitoring for either a user control input 404 or a scheduled event 406 to occur. The scheduled events are driven by a processor-based calendar/clock function. Example scheduled events maintained for each independent valve station within the valve group, can include but are not limited to valve turn on, valve turn off and read parameter status. When a user control input 404 is detected, the software will first execute the user command 408, then update program variables 410, then update the display 412 and finally update the event schedule 414. The user enters commands using either 208 and display updates are provided to 206. When a scheduled event 406 is detected, the software will first decode the event 416 to determine required action and then determine the valve station ID 418 to receive the action. When a read parameter status event 420 is detected, the software will send a parameter status request 426 to the specific station ID and receive a parameter status 428 from the same station ID. Further, upon detection of a turn on valve event 422 the software will send a valve on command 430 to the specific station ID. Similarly, upon detection of a turn off valve event 424 the software will send a valve off command 432 to the specific station ID. Upon completion of the command processing the software will return to the continuous wait loop.

FIG. 5 shows an example software flowchart describing the operation of control software 330 as a set of process steps. Beginning at the flowchart "Start", after power-up the program variables and modem interfaces are initialized in steps 500 and 502 respectively. After initialization, the software enters a continuous wait loop monitoring for a control event 504 to be received. When control event 504 is received, the station ID match 520 is checked before processing the control event. Each station has a unique station ID whereby control events are only processed by the specified station. When a turn on valve event 512 is detected, the software will energize the solenoid valve 506 by commanding the voltage switch on. When a turn off valve event 514 is detected, the software will de-energize the solenoid valve 508 by commanding the voltage switch to off. Finally, upon detection of a report parameter status report event 516 the software will first determine the parameter status as shown in FIG. 6 and then send the parameter status 510 back to the controller module. Upon completion of the control event processing the software will return to the continuous wait loop.

FIG. 6 shows an example software flowchart describing the operation of performance monitor logic within control software 330 as a set of process steps. Starting at point "A" from FIG. 5, if the valve state has been commanded to open 600 the software will evaluate fault types associated with a valve open condition. Conversely, if the valve state has been commanded to close 602 the software will evaluate fault types associated with a valve closed condition. Open valve fault conditions include but are not limited to solenoid over current 606, solenoid under current 608, flow rate too high 610 and flow rate too low 612. In the event one of the above fault conditions is detected, the software will report the associated parameter status: solenoid over current 614, solenoid under current 616, high flow rate 618 and low flow rate 620. When no fault condition is detected a no fault status is reported 622. Closed valve fault conditions include but are not limited to a flow above limit 604. In this case, the associated leakage status 624 is reported. The flow chart exits FIG. 6 at point "B" returning to FIG. 5.

An alternate embodiment of the present invention consists of replacing the wired digital control interface connection between each valve station and the controller module with a wireless format. Any commonly available industry standard wireless protocol (example Wi-Fi) can be used to implement the digital control interface. Additionally, power to each valve station can be supplied by wires, batteries or solar methods. The operation of this embodiment is limited by communications distance of the wireless connection but can support an increased number of remote valve stations.

A further alternate embodiment of the present invention consists of replacing the separate inlet and outlet pressure sensors with a single two port differential pressure sensor. These differential sensors can also be based, for example, on a MEMS device whereby each pressure sensing port is applied to opposite faces of the deflecting surface. In this embodiment, both the inlet and outlet pressure measurement points would be routed to a single differential pressure sensor.

The claimed invention is:

1. A fluid control valve comprising:

a. a housing including a fluid inlet and a fluid outlet configured to be connectable in series to a fluid pipe;

b. an inlet pressure sensor circuit coupled to the fluid inlet, the pressure sensor circuit generating pressure information in response to fluid pressure;

c. a fluid control valve coupled to the inlet pressure sensor circuit and coupled to a solenoid circuit, the fluid control valve mechanically opening and closing in response to the solenoid circuit;

d. an orifice coupled to the fluid control valve, the orifice generating a differential pressure drop in response to fluid flow;

e. an outlet pressure sensor circuit coupled to the orifice and coupled to the fluid outlet, the pressure sensor circuit generating pressure information in response to fluid pressure;

f. a processor executing control software;

g. a voltage switch circuit coupled to the solenoid circuit, the voltage switch circuit controlling the application of voltage to the solenoid circuit in response to control signal information;

h. a Highway Addressable Remote Transducer (HART) digital data modem transformer coupled to an external power/data interface and coupled to the processor, the digital data modem operating on digital data information in response to the processor or the external power/data interface;

i. wherein the external power/data interface is configured as a two-wire connection supporting both bi-directional digital data transmission and AC power;

j. wherein the processor is configured to receive pressure information from the inlet/outlet pressure sensor circuits;

k. wherein the processor is configured to apply control signal information to the voltage control switch circuit;

l. Wherein the digital data modem is configured to separate the frequency shift key (FSK) modulated digital data information from the AC power by frequency selection;

m. wherein the control software is configured to respond to a unique station identification thereby supporting sending commands and receiving status to/from individual valves within a valve group;

n. wherein the control software is configured to calculate a fluid flow rate based on pressure information and determine a performance condition;

o. wherein the control software is configured to control the application of a control signal to the voltage switch circuit; and p. wherein the control software is configured to communicate digital data information with the external power/data interface.

2. The system of claim 1, further comprising a replaceable orifice utilized to customize valve operation for base flow rate sizing.

3. A method of monitoring performance of a fluid control valve comprising:
a. generating inlet pressure information by a pressure sensor circuit in response to fluid pressure;
b. generating outlet pressure information by a pressure sensor circuit in response to fluid pressure;
c. generating a differential pressure drop by an orifice in response to fluid flow;
d. executing control software on a processor;
e. receiving pressure information by the processor in response to inlet/outlet pressure sensor circuits;
g. operating on bi-directional digital data information by a Highway Addressable Remote Transducer (HART) digital data modem in response to the processor or an external transformer coupled two-wire connection power/data interface;
h. controlling a voltage switch circuit by application of control signal information in response to the processor;
i. separating frequency shift key (FSK) modulated digital data information from AC power by the digital data modem using frequency selection in response to the processor or the external transformer coupled two-wire connection power/data interface;
j. calculating a fluid flow rate by control software in response to pressure information and determining a performance condition;
k. responding to a unique station identification by control software thereby supporting sending commands and receiving status to/from individual valves within a valve group; and
l. Communicating with the external two-wire connection power/data interface by control software in response to digital data information.

4. The method of claim 3, further comprising customizing the valve operation for base flow rate sizing by orifice replacement via an external access door.

5. An irrigation system comprising:
a. a control module including a user display and controls configured to execute control software;
b. a power/data cabled interface configured as a daisy chain two-wire connection supporting both bi-directional digital data transmission and AC power coupled to the control module, the power/data interface communicating digital data information in response to the control software;
c. a remote valve group configured as multiple individual valve components transformer coupled to the power/data interface, the remote valve group activating individual valve components in response to the power/data interface digital data information;
d. wherein the control software is configured to interact with an operator to configure/interact with the system via the user controls;
e. wherein the control software is configured to monitor individual valve component performance parameters and perform fault analysis to aid in problem diagnosis;
f. wherein the control software is configured to send commands and receive status from individual valve components within the remote valve group using unique station identifiers;
g. wherein the control software is configured to display performance parameters on the user display; and
h. wherein a Highway Addressable Remote Transducer (HART) digital data modem transformer coupled to the power/data interface within the control module is configured to separate the frequency shift key (FSK) modulated digital data information from the AC power by frequency selection.

* * * * *